April 17, 1962 B. FENNICK 3,030,522

PHASE SELECTIVE DIODE GATE CIRCUIT

Filed Feb. 4, 1958

INVENTOR.
BENJAMIN FENNICK
BY Chas. M. Funkhouser
ATTORNEY

United States Patent Office 3,030,522
Patented Apr. 17, 1962

3,030,522

PHASE SELECTIVE DIODE GATE CIRCUIT

Benjamin Fennick, River Edge, N.J., assignor to The Bendix Corporation, a corporation of Delaware Filed Feb. 4, 1958, Ser. No. 713,165
8 Claims. (Cl. 307—88.5)

Figures 1, 2:
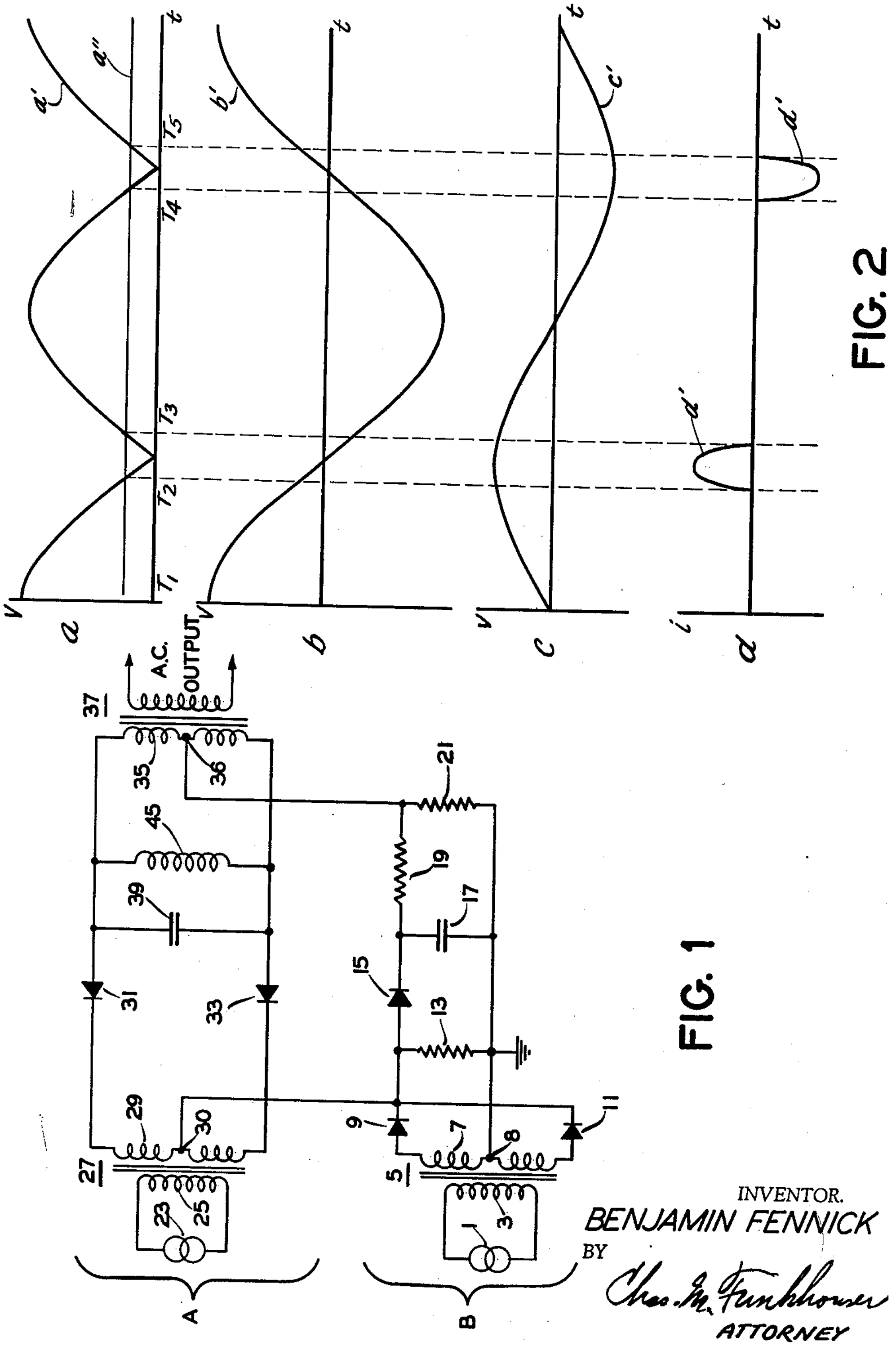

This invention relates to gate circuits and more particularly to phase selective gate circuits.

Out-of-phase signal voltages are undesirable in amplification systems since they seriously overload the amplifier and result in a sharp reduction in the amplification of the in-phase signals.

Circuits heretofore used for the rejection of out-of-phase signals are relatively expensive to manufacture because they require matched components and accurate balancing if the circuits are subjected to wide temperature variations. Furthermore, existing circuits provide a direct current output which is not suitable for use with transistor amplifiers.

One object of this invention is to provide a phase selective gate circuit which is reliable over wide temperature ranges.

Another object of the invention is to provide a phase selective gate circuit which may be easily constructed and does not require matched components.

A further object of the invention is to provide a phase selective gate circuit having an alternating current output.

Another object is to provide a gate circuit which effectively rejects quadrature signals.

The invention contemplates the use of a pair of diodes having their cathodes connected to a source of pulsating unidirectional current and their anodes connected to a constant source of unidirectional current for providing a phase selective gate circuit to pass a desired phase component of a signal applied to the cathodes of the diodes and to reject out-of-phase signals.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In the drawing:

FIGURE 1 is a schematic diagram of a phase selective gate circuit constructed according to the invention; and FIGURE 2 shows the phase relationship of applied voltages and resulting current in the circuit of FIGURE 1.

In FIGURE 1 a source of alternating signal voltage 23 is applied to a novel gating circuit A constructed according to the invention and comprising a primary winding 25 of a transformer 27. A center-tapped secondary winding 29 of transformer 27 is connected across the cathodes of a pair of diodes 31 and 33. The anodes of diodes 31 and 33 are connected to opposite ends of a centertapped secondary winding 35 of a transformer 37. A capacitor 39 and inductive winding 45 are connected in parallel between the anodes of diodes 31 and 33 and tuned to resonance at the signal frequency.

A source of alternating reference voltage 1, having the same frequency as signal voltage 23, is applied to a fullwave rectifier B comprising a primary winding 3 of a transformer 5. A centertapped secondary winding 7 of transformer 5 is connected across the anodes of a pair of rectifiers 9 and 11 which have their cathodes connected to one end of a resistor 13. The other end of resistor 13 is connected to centertap 8 on secondary winding 7 and grounded. Rectifiers 9 and 11 provide fullwave rectification of the voltage appearing across secondary winding 7 as shown at *a'* in FIGURE 2*a* and resistor 13 provides a current path for the rectifier.

The pulsating rectified voltage is applied to the anode of a diode 15 which passes the peaks of the rectified voltage to charge a condenser 17 connected between the cathode of diode 15 and ground. Condenser 17 charges to approximately the peak value of the rectified voltage and maintains a constant unidirectional voltage across a pair of series connected resistors 19 and 21 connected between the cathode of diode 15 and ground in parallel with the condenser. The constant unidirectional voltage across resistor 21 is shown by the line *a''* in FIGURE 2*a*.

The pulsating fullwave rectified voltage of twice the frequency of signal voltage 23, shown at *a'* in FIGURE 2*a*, appearing at the cathodes of rectifiers 9 and 11 is applied to centertap 30 of secondary winding 29 and the constant unidirectional voltage of the same polarity as the fullwave rectified voltage, shown at *a''* in FIGURE 2*a*, appearing across resistor 21 is applied to centertap 36 of secondary winding 35.

With this arrangement the pulsating rectified voltage applied to the cathodes of the diodes 31 and 33 through winding 29 opposes conduction of the diodes as long as its instantaneous voltage exceeds the constant unidirectional voltage applied to the anodes of the diodes 31 and 33 through winding 35. The diodes are non-conductive from time $T_1$ to $T_2$ and from time $T_3$ to $T_4$ while their anodes are negative relative to their cathodes. The diodes conduct from time $T_2$ to $T_3$ and from time $T_4$ to $T_5$, while their anodes are positive relative to their cathodes.

FIGURES 2*b* and 2*c* show quadrature and in-phase signals, respectively. The maximum voltage of the in-phase signal of FIGURE 2*c* occurs at times $T_2$ to $T_3$ and $T_4$ to $T_5$ when diodes 31 and 33 are conductive and during those times quadrature signals of FIGURE 2*b* pass through zero. This provides maximum conductance of the in-phase signals and minimum conductance of quadrature or out-of-phase signals.

FIGURE 2*d* shows the current pulses gated through diodes 31 and 33 in response to the in-phase component of the signal. These current pulses are applied to the tuned capacitance and inductance network 39 and 41 for the rejection of harmonic components and only the fundamental of the in-phase component of the signal voltage appears across the secondary winding of transformer 37.

The novel circuit described provides a highly reliable phase selective gate circuit which effectively rejects quadrature signals and operates independently of temperature variations and without the need of expensive matched components. Furthermore, the circuit provides an alternating current output free of harmonics and suitable for use with a transistor amplifier.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A gate circuit having an input for receiving alternating current signals with harmonics and quadrature voltages and having an output for providing voltages corresponding in phase and amplitude to the phase and amplitude of the signals but free of harmonics and quadrature voltages, a pair of diodes connected between the input and the output, a tuned circuit connected to the output, a pulsating unidirectional voltage source of twice the frequency of the signal and a substantially constant unidirectional voltage source connected across the diodes to periodically render the diodes conducting to pass the desired phase component of the signal.

2. A phase selective gate circuit comprising a pair of diodes, a first transformer having a primary winding for receiving a signal and having a centertapped secondary winding connected to the diodes, a source of pulsating unidirectional voltage connected to the centertap of the secondary winding, a second transformer having a centertapped primary winding connected to the diodes, and a substantially constant source of unidirectional voltage connected to the centertap of the primary winding of the second transformer and to the other source to cooperate with the pulsating unidirectional voltage and provide a gating voltage across the diodes to periodically render the diodes conducting to pass a desired phase component of the signal.

3. A phase selective gate circuit comprising a pair of diodes, a first transformer having a primary winding for receiving a signal and a centertapped secondary winding connected to the cathodes of the diodes, a source of pulsating unidirectional voltage connected to the centertap of the secondary winding, a second transformer having a centertapped primary winding connected to the anodes of the diodes, and a source of substantially constant unidirectional voltage connected to the centertap of the primary winding of the second transformer and to the other source to cooperate with the pulsating unidirectional voltage and provide a gating voltage across the diodes to periodically render the diodes conducting to pass a desired phase component of the signal.

4. The device claimed in claim 3 wherein the source of pulsating unidirectional voltage is controlled by an alternating reference voltage for determining the phase component to be passed.

5. A phase selective gate circuit comprising a pair of diodes, a pair of transformers each having a centertapped winding, each of said windings connecting corresponding elements of the diodes, a source of pulsating unidirectional voltage connected to one of the centertaps and a source of substantially constant unidirectional voltage connected to the other centertap and the sources being connected together to provide a gating voltage across the diodes to periodically render the diodes conducting to pass a desired phase component of a signal applied to one of the transformers.

6. A gate circuit having an input for receiving alternating current signals with harmonics and quadrature voltages and having an output for providing voltages corresponding in phase and amplitude to the phase and amplitude of the signals but free of harmonics and quadrature voltages, a pair of diodes connected between the input and the output, a tuned circuit connected to the output, and a pulsating unidirectional voltage source and a substantially constant unidirectional voltage source connected across the diodes to periodically render the diodes conducting when the constant unidirectional voltage exceeds the pulsating unidirectional voltage to pass the desired phase component of the signal.

7. A phase selective gate circuit comprising a pair of diodes, a source of pulsating unidirectional voltage and a source of substantially constant unidirectional voltage of the same polarity connected across the diodes to periodically render the diodes conducting when the constant unidirectional voltage exceeds the pulsating unidirectional voltage to pass a desired phase component of a signal voltage applied to the diodes.

8. A phase selective gate circuit comprising a pair of diodes, a source of pulsating unidirectional voltage connected to the cathodes of the diodes and a source of substantially constant unidirectional voltage connected to the anodes of the diodes, the sources being of the same polarity and being connected in series to periodically render the diodes conducting when the constant unidirectional voltage exceeds the pulsating unidirectional voltage to pass a desired phase component of a signal voltage applied to the cathodes of the diodes.

References Cited in the file of this patent

UNITED STATES PATENTS

| | | |
|---|---|---|
| 2,443,195 | Pensyl | June 15, 1948 |
| 2,554,987 | Hogle | May 29, 1951 |
| 2,722,605 | Mills et al. | Nov. 1, 1955 |
| 2,764,679 | Berkowitz | Sept. 25, 1956 |
| 2,760,132 | Pawley | Aug. 21, 1956 |
| 2,841,719 | Radcliffe | July 1, 1958 |

OTHER REFERENCES

Waveforms-Radiation Laboratory Series, McGraw-Hill, first ed. 1949 (page 373).